United States Patent
Morel et al.

(10) Patent No.: US 11,480,460 B2
(45) Date of Patent: Oct. 25, 2022

(54) METHOD OF ANALYZING A VIBRATORY SIGNAL DERIVED FROM ROTATION OF AT LEAST ONE MOVING PART BELONGING TO A ROTARY MECHANISM

(71) Applicant: AIRBUS HELICOPTERS, Marignane (FR)

(72) Inventors: Herve Morel, Lamanon (FR); Jonathan Rodriguez, Villeneuve-sous-Charigny (FR)

(73) Assignee: AIRBUS HELICOPTERS, Marignane (FR)

(*) Notice: Subject to any disclaimer, the term of this patent is extended or adjusted under 35 U.S.C. 154(b) by 533 days.

(21) Appl. No.: 16/508,696

(22) Filed: Jul. 11, 2019

(65) Prior Publication Data
US 2020/0018637 A1    Jan. 16, 2020

(30) Foreign Application Priority Data
Jul. 12, 2018 (FR) ...................... 1800739

(51) Int. Cl.
*G01H 1/00* (2006.01)
*G01H 1/04* (2006.01)
(Continued)

(52) U.S. Cl.
CPC .......... *G01H 1/006* (2013.01); *B64C 27/006* (2013.01); *B64D 45/00* (2013.01); *G01H 1/003* (2013.01);
(Continued)

(58) Field of Classification Search
CPC .......... G01H 1/006; G01H 1/003; G01H 1/04; B64C 27/006; B64C 27/001; B64C 27/12;
(Continued)

(56) References Cited

U.S. PATENT DOCUMENTS

| 7,325,461 B2 | 2/2008 | Bitto et al. |
| 7,363,172 B2 | 4/2008 | Nichols et al. |

(Continued)

FOREIGN PATENT DOCUMENTS

| EP | 0889316 A2 | 1/1999 |
| EP | 0889316 A3 | 1/1999 |

(Continued)

OTHER PUBLICATIONS

French Search Report for French Application No. FR 1800739, Completed by the French Patent Office, dated May 8, 2019, 11 pages.
(Continued)

*Primary Examiner* — Stephanie E Bloss
(74) *Attorney, Agent, or Firm* — Brooks Kushman P.C.

(57) ABSTRACT

A method of analyzing a vibratory signal derived from rotation of at least one moving part belonging to a rotary mechanism forming all or part of a drive train for transmitting drive torque, the rotary mechanism being fitted to an aircraft and the method comprising at least one first measurement step including measuring vibration in at least one direction and generating a vibratory signal representative of the operation of the rotary mechanism as a function of time, the first measurement step being performed by means of at least one vibration sensor; and at least one second measurement step including measuring an angular position of the moving part, the moving part having at least one degree of freedom to move in rotation about a respective axis of rotation Z. Such an analysis method makes it possible to determine at least one usable range for the vibratory signal.

14 Claims, 3 Drawing Sheets

(51) Int. Cl.
*G01M 13/028* (2019.01)
*G06F 17/15* (2006.01)
*B64D 45/00* (2006.01)
*B64C 27/00* (2006.01)

(52) U.S. Cl.
CPC .......... *G01H 1/04* (2013.01); *G01M 13/028* (2013.01); *G06F 17/156* (2013.01); *B64C 27/001* (2013.01); *B64D 2045/0085* (2013.01)

(58) Field of Classification Search
CPC .......... B64D 45/00; B64D 2045/0085; G01M 13/028; G06F 17/156
See application file for complete search history.

(56) References Cited

U.S. PATENT DOCUMENTS

| | | | |
|---|---|---|---|
| 2007/0006636 A1* | 1/2007 | King | G01H 1/003 73/1.84 |
| 2007/0260656 A1* | 11/2007 | Wiig | G05B 23/0221 708/200 |
| 2011/0046929 A1 | 2/2011 | Bryant | |
| 2013/0013185 A1* | 1/2013 | Smitherman | H04N 5/23238 348/148 |
| 2013/0211677 A1* | 8/2013 | Oblizajek | B62D 5/0472 701/42 |
| 2014/0039809 A1* | 2/2014 | Girondin | G01H 1/00 702/39 |
| 2020/0018637 A1* | 1/2020 | Morel | G01H 1/04 |

FOREIGN PATENT DOCUMENTS

| | | |
|---|---|---|
| EP | 3284669 A1 | 2/2018 |
| FR | 2900746 A1 | 11/2007 |

OTHER PUBLICATIONS

Feng Ke et al. A Phase Angle Based Diagnostic Scheme to Plantetary Gear Faults Diagnostics Under Non-Stationary Dperational Conditions. Journal of Sounds and Vibration. vol. 408, pp. 190-209. Jul. 21, 2017. 20 pages.

* cited by examiner

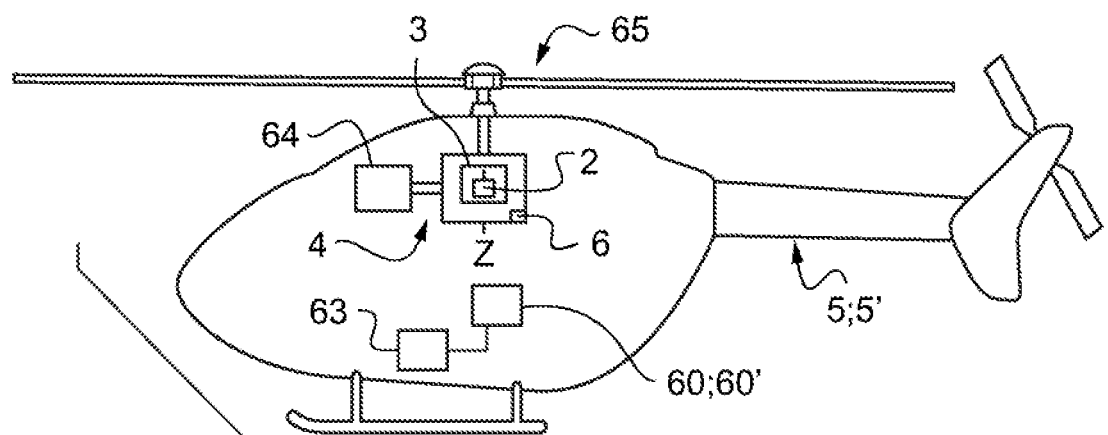
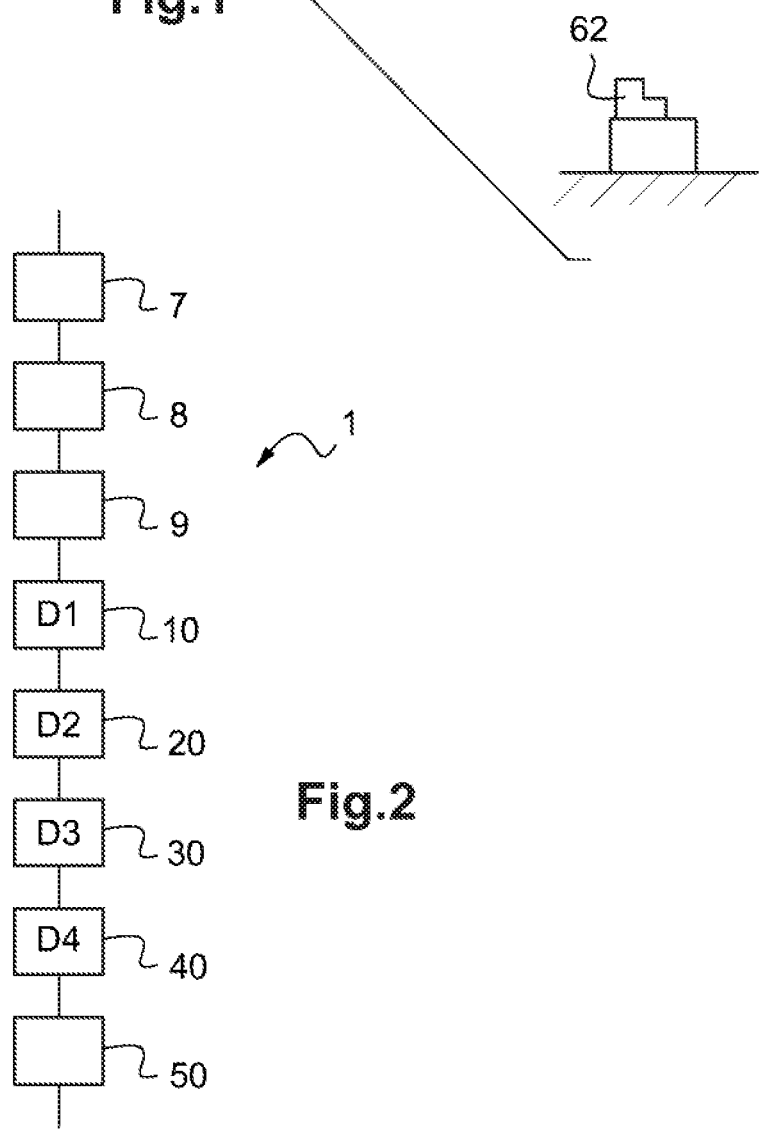
Fig.1
Fig.2

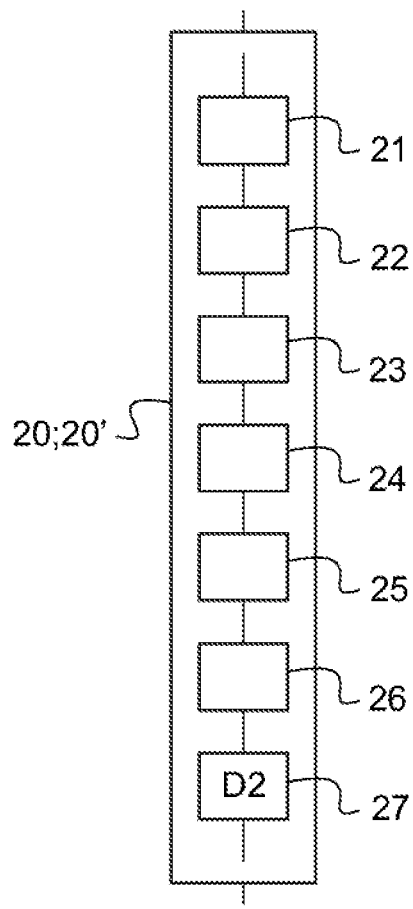
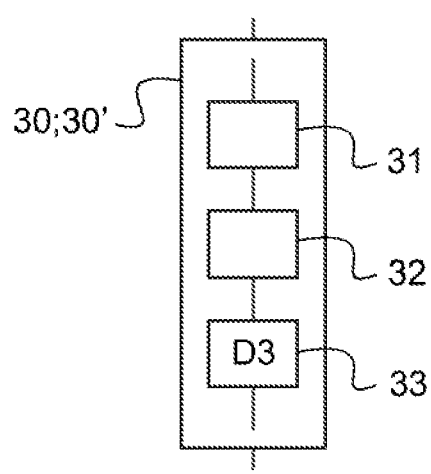
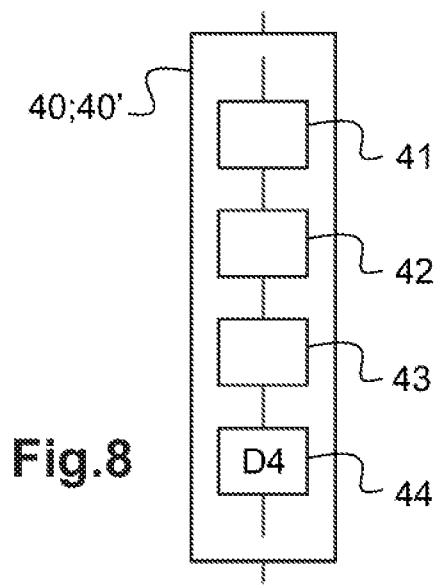

METHOD OF ANALYZING A VIBRATORY SIGNAL DERIVED FROM ROTATION OF AT LEAST ONE MOVING PART BELONGING TO A ROTARY MECHANISM

CROSS-REFERENCE TO RELATED APPLICATIONS

This application claims priority to French patent application No. FR 1800739 filed on Jul. 12, 2018, the disclosure of which is incorporated in its entirety by reference herein.

BACKGROUND OF THE INVENTION

(1) Field of the Invention

The present invention relates to the field of aviation, and more precisely to the field of methods of analyzing a vibratory signal generated by the operation of a rotary mechanism as a function of time, such a rotary mechanism being fitted to an aircraft, e.g. such as an airplane or a rotorcraft.

(2) Description of Related Art

Specifically, aircraft generally include at least one engine, a drive train for transmitting drive torque, and propulsion and/or lift means serving to provide the aircraft with propulsion and possibly also lift in the air.

By way of example, the rotary mechanism may then form an epicyclic geartrain forming part of the drive train for transmitting drive torque. The rotary mechanism thus includes at least one moving part rotating about an axis of rotation, with this taking place relative to the structure of the aircraft. By way of example, the rotating moving part may then consist in a sun gear, a planet carrier, or a planet gear of an epicyclic geartrain.

Once the vibratory signal has been acquired, methods of monitoring wear, the formation of cracks, and/or structural breakage in the rotating moving part can then be performed.

In addition, compared with an ideal vibratory signal, the acquired vibratory signal may present interference, noise, or indeed other defects intrinsic to the design of the aircraft and/or to the way the aircraft is being made. Such defects may in particular consist in high or low levels of distortion, a time offset, or local instability thereby preventing posteriori identification of a structural defect or of wear in the rotating moving part(s).

In general, and as described in Documents EP 0 889 316, FR 2 900 746, EP 3 284 669, U.S. Pat. No. 7,325,461, U.S. Pat. No. 7,363,172, and US 2011/0046929, it is known to monitor and identify degradation of a mechanism by measuring and analyzing a vibratory signal representative of the operation of the mechanism.

Nevertheless, in those documents, no prior validation is performed on the vibratory signal upstream from the analysis proper in order to determine at least one usable range. Consequently, the analysis of the vibratory signal may turn out to be erroneous and might fail to generate any alarm warning a maintenance crew of a failure or of severe wear of the moving part(s), and on the contrary such analysis might equally well generate false alarms leading to the maintenance crew dismantling the moving part(s) pointlessly.

In addition, the document "A phase angle based diagnostic scheme to planetary gear faults diagnostics under non-stationary operational conditions" written by the authors Ke Feng, Kesheng Wag, Qing Ni, Ming J. Zuo, and Dongdong Wei, and published in the "Journal of Sound and Vibration", Vol. 408, Nov. 10, 2017, pp. 190-209, describes a method of analyzing faults in a rotary mechanism by using a complex vibratory signal and analyzing an argument of those complex numbers obtained from the complex vibratory signal. Furthermore, in a complex plane, such an argument of a complex number consists in an angle expressed in radians between an abscissa axis and an axis passing through a point that is the image of a complex number derived from the complex vibration. The argument of the complex number is also commonly referred to by the term "phase", or indeed by the term "phase angle".

Consequently, although the above-mentioned document relates to analyzing a phase angle in order to identify a defect in a planetary gear, it nevertheless does not provide any information serving to validate a usable range for a vibratory signal prior to analyzing that signal proper in order to identify the defect in the planetary gear.

BRIEF SUMMARY OF THE INVENTION

An object of the present invention is thus to propose a method of analysis that makes it possible to guarantee that the vibratory signal can be used subsequently. Such a method thus serves to avoid certain values of the vibratory signal that are not usable subsequently for identifying a structural defect in the moving part(s).

As mentioned above, the invention thus provides a method of analyzing a vibratory signal derived from rotation of at least one moving part belonging to a rotary mechanism forming all or part of a drive train for transmitting drive torque, the rotary mechanism being fitted to an aircraft and the method comprising:

at least one first measurement, step including measuring vibration in at least one direction and generating a vibratory signal representative of the operation of the rotary mechanism as a function of time, the first measurement step being performed by means of at least one vibration sensor; and at least one second measurement step including measuring an angular position of the moving part(s), the moving part(s) having at least one degree of freedom to move in rotation about a respective axis of rotation, the second measurement step(s) serving to count a determined number n of rotations of the moving part(s) about the respective axis of rotation.

According to the invention, such a method is remarkable in that it comprises at least:

a preprocessing step for calculating a plurality of arguments of complex numbers generated from complex vibrations of the vibratory signal measured by the vibration sensor(s) over a cycle of the predetermined number n of rotations of the moving part(s) about the respective axis of rotation;

a first analysis step for determining an angle offset relating to the plurality of arguments, the first analysis step serving to generate a first analysis result D1, the first analysis result D1 consisting in a condition that is satisfied or not satisfied as a function of the angle offset;

a second analysis step for determining a first distortion, referred to as "low" distortion, of the plurality of arguments, the second analysis step serving to generate a second analysis result D2, the second analysis result D2 consisting in a condition that is satisfied or not satisfied as a function of the first distortion;

a third analysis step for determining local instability of the plurality of arguments, the third analysis step serving to generate a third analysis result D3, the third analysis result D3 consisting in a condition that is satisfied or not satisfied as a function of the local instability;

a fourth analysis step for determining a second distortion, referred to as a "high" distortion, of the plurality of arguments, the fourth analysis step serving to generate a fourth analysis result D4, the fourth analysis result D4 consisting in a condition that is satisfied or not satisfied as a function of the second distortion, the second distortion being distinct from the first distortion; and a validation step for determining at least one usable time range for the vibratory signal, the validation step depending simultaneously on the first analysis result D1, on the second analysis step D2, on the third analysis result D3, and on the fourth analysis result D4.

In other words, such an analysis method makes it possible to ensure that the acquired data representative of the vibratory signal is of a usable nature. The four analysis steps included in the method may be performed simultaneously in parallel or else sequentially one after another. Such analysis steps serve to keep away from ranges of the vibratory signal that are not usable since they include at least one defect relating to an angular offset, low distortion, local instability, or high distortion.

Thus, the first analysis step serves to determine an angle offset relating to the plurality of arguments. The term "angle offset" is used to mean the offset of the signal concerning phases measured between each revolution of the rotor during a cycle. For each cycle of the predetermined number n of rotations of the moving part(s), an angle offset is then calculated between the vibratory signal and a mean signal, i.e. an offset along an abscissa time axis between the vibratory signal and a mean signal. Thereafter, a first analysis result D1 is determined as a function of the value of the calculated angle offset.

Likewise, the second analysis step serves to determine low distortion relating to the plurality of arguments. The term "low distortion" is used to mean uniform deformation of the signal concerning phases measured between each revolution of a rotor during a cycle. For each cycle of a predetermined number n of rotations of the moving part(s), an amplitude difference is calculated along an ordinate axis between the vibratory signal and a reference signal. A second analysis result D2 is determined as a function of the value corresponding to the calculated amplitude difference.

Furthermore, the third analysis step serves to determine local instability relating to the plurality of arguments. The term "local instability" is used to mean non-uniform defoliation of the measured phase signal between each revolution of the rotor during a cycle. For each cycle of the predetermined number n of rotations of the moving part(s), a local instability is then calculated on the basis of the vibratory signal. A third analysis result D3 is then determined as a function of the value of said calculated local instability.

Finally, the fourth analysis step serves to determine high distortion relating to the plurality of arguments. The term "high distortion" is used to mean deformation of the phase signal that is uniform, with the appearance of dominant side harmonics, this uniform deformation being measured between each revolution of the rotor during a cycle. For each cycle of the predetermined number n of rotations of the moving part(s), the energy of the vibratory signal is then calculated, and it is compared with the mean energy. A fourth analysis result D4 is determined as a function of the value of the energy of the vibratory signal. Naturally, such high distortion corresponds to distortion of higher order and/or of strength greater than the low distortion.

Advantageously, the validation step is successful if each of the first analysis result D1, the second analysis result D2, the third analysis result D3, and the fourth analysis result D4 consists in a respective condition that is not satisfied.

In other words, the first analysis result D1, the second analysis result D2, the third analysis result D3, and the fourth analysis result D4 may be formed by respective logic variables each having only two mutually distinct values. Furthermore, such a condition that is not satisfied may for example consist in a value 0 or a "false" state in Boolean terminology as contrasted with a value 1 or a "true" state. Under such circumstances, the validation step determines a usable range for the vibratory signal when all of the analysis results D1 to D4 are in the false state.

In practice, the preprocessing step, the first analysis step, the second analysis step, the third analysis step, the fourth analysis step, and the validation step may be performed on board the aircraft, the aircraft including an onboard memory for storing the vibratory signal over at least the usable range(s).

In other words, such an analysis method makes it possible to determine the usable range(s) for the vibratory signal directly while the aircraft is in flight on a mission. Such an analysis method then serves to limit the quantity of data that is stored in the onboard memory, with the vibratory signal being stored only in the usable range.

In an advantageous implementation of the invention, the validation step may be performed on the ground, the aircraft including an onboard memory for continuously storing the vibratory signal.

Under such circumstances, the validation step may in particular be performed a posteriori after the mission of the aircraft has terminated. All of the data representing the vibratory signal is stored in the onboard memory so as to enable it to be analyzed once the aircraft is on the ground.

Advantageously, the method may include a data transmission step enabling data representative of the vibratory signal to be transmitted to at least one ground station.

Such a transition step may thus be optional when the validation step is performed on board the aircraft, or else it may be necessary when the validation step is performed on the ground in a processor unit that is separate from the aircraft.

In addition, the data transmission step may take place in dependence simultaneously on the first analysis result D1, on the second analysis result D2, on the third analysis result D3, and on the fourth analysis result D4.

Specifically, such a data transmission step may also be associated with the validation step for determining the usable range of the vibratory signal. The transmission step may thus be performed to transmit to the ground only the usable data of the vibratory signal.

In practice, the preprocessing step may comprise:

a calculation substep for calculating a first moving window Fourier transform from the vibratory signal; and a second calculation substep for calculating a first matrix $ANG_{1 \to n}$ of n arguments $ANG_k$, where k varies over the range 1 to n, where n corresponds to a number of rotations of the moving part(s) respectively about said respective axis of rotation.

In other words, such a preprocessing step, and more particularly the substep of calculating the first Fourier transform, serves to provide n argument-and-frequency charts in a complex plane. These charts are such that the abscissa axis corresponds to angle values over one revolution of the moving part(s), e.g. constituted by a planet carrier of the epicyclic geartrain of the main power transmission gearbox (MGB) of the aircraft. The ordinate axis corresponds to frequency values at the various harmonics of the first Fourier transform, and the third axis of these charts corresponds to the amplitude values of the complex vibratory signal as calculated from the first moving window Fourier transform. In addition, the term "moving window Fourier transform" is used to designate a Fourier transform having a window and that consists in applying the Fourier transform to each piece of the signal contained in a window under consideration and then shifting the window all along the complex vibratory signal.

On the basis of this complex vibratory signal, it is then possible to perform the calculation substep for calculating the first matrix $ANG_{1 \to n}$ over n revolutions of the moving part(s).

In an advantageous implementation of the invention, the first analysis step may comprise:

a calculation substep for calculating a second matrix of angle cosines $P_{1 \to n}$ from n cosine values $P_K$ of the first matrix $ANG_{1 \to n}$, and such that:

$$P_k = \cos(ANG_k)$$

a calculation substep for calculating a mean value $P_{moy}$ from the n cosine values $P_k$ constituting the second matrix $P_{1 \to n}$;

an identification substep for identifying a median signal $P_{moy}$ by calculating the minimum Euclidean distance between the mean value $P_{moy}$ and each of said n cosine values $P_k$ constituting the second matrix $P_{1 \to n}$;

a calculation substep for calculating n inter-correlation values $\hat{R}_k$, such that $\dim(\hat{R}_k) = 2Z_c - 1$, the n inter-correlation values $\hat{R}_k$ being calculated by taking the convolution product between the median signal $P_{med}$ and each of the n cosine values $P_k$ constituting the second matrix $P_{1 \to n}$, where $Z_c$ corresponds to the number of teeth of a stationary ring co-operating with the moving part(s);

a calculation substep for calculating n time offset values $T_k$, such that $T_k$ corresponds to an abscissa value for an absolute maximum of a curve representative of the n cross-correlation values $\hat{R}_k$, varying over the range 1 to n, and when $k = P_{med}$, $T_{P_{med}} = \mathrm{argmax}(\hat{R}_{P_{med}}) = 0$; and a first diagnosis substep for generating the first analysis result D1 that consists in a condition that is satisfied if at least one of the n values of the time offset $T_k$, where k varies over the range 1 to n, is greater than a first predetermined threshold value S1, and conversely in a condition that is not satisfied if all of the n values of the time offset $T_k$ are less than or equal to the first predetermined threshold value S1.

In addition, the substep of calculating n inter-correlation values corresponds to calculating cross-correlation or cross-covariance and serves in conventional manner to determine a measurement of similarity between two signals.

Furthermore, the first diagnosis substep consists in comparing the various time offset values $T_k$ with the first predetermined threshold value S1. Such a first predetermined threshold value S1 is thus determined by testing or by simulation and it is stored in a storage unit. If necessary, it is thus possible to modify the severity of this first diagnosis substep by decreasing or by increasing the first threshold value S1. Specifically, the smaller this first threshold value S1 the greater the chance of the first analysis result D1 consisting in a condition that is satisfied, and conversely, the greater the first threshold value S1, the greater the chance of the first analysis result D1 constituting a condition that is not satisfied.

Advantageously, the second analysis step may comprise:

a resetting substep of resetting the n cosine values constituting the second matrix $P_{1 \to n}$ by a number corresponding to the n values of a time offset $T_k$ order to generate a third matrix $C_{1 \to n}$ of n reset values $C_k$ for k varying over the range 1 to n;

a calculation substep for calculating a second Fourier transform from the median signal $P_{med}$;

a calculation substep for calculating a mean argument value $\varphi_{moy}$ for a predetermined harmonic $H_m$ of the second Fourier transform, the mean argument value $\varphi_{moy}$ being such that:

$$\varphi_{moy} = a\tan 2(y, x) = \mathrm{Arg}(x + iy)$$

where $x = \mathrm{Re}(Hm)$ is the real part of the predetermined harmonic $H_m$ of the second Fourier transform and $y = \mathrm{Im}(Hm)$ is the imaginary part of the predetermined harmonic $H_m$ of the second Fourier transform;

a calculation substep for calculating n values of a reference argument $P_{ref}$ such that $P_{ref} = A \cdot \cos(\omega + \varphi_{moy})$, with the coefficient $A = 1$ and with the angular frequency $$\omega = \frac{2 \cdot \pi \cdot p}{Z_C};$$

a comparison substep for comparing the n reset values $C_k$ constituting the third matrix $C_{1 \to n}$ and the n values of the reference argument $P_{ref}$, the comparison substep generating n difference values $I_k$, such that:

$$I_k = \Sigma |C_k - P_{ref}|$$

with k varying over the range 1 to n;

a calculation substep for calculating a normalized distortion EC such that:

$$EC = \frac{\sum_{k=1}^{n} I_k}{2 \cdot n \cdot Z_C};$$

and a second diagnosis substep for generating the second analysis result D2 consisting in a condition that is satisfied if the normalized distortion EC is greater than a second predetermined threshold value S2, and conversely a condition that is not satisfied if the normalized distortion EC is less than or equal to the second predetermined threshold value S2.

Consequently, the second diagnosis substep consists in comparing the various normalized distortion values EC with the second predetermined threshold value S2. Such a second predetermined threshold value S2 can thus likewise be determined by testing or by simulation and can be stored in a storage unit. If necessary, it is thus possible to modify the severity of this second diagnosis substep by decreasing or increasing the second threshold value S2. Specifically, the smaller the second threshold value S2, the greater the chance of the second analysis result D2 consisting in a condition that is satisfied, and conversely, the greater the second threshold value S2, the greater the chance of the second analysis result D2 consisting in a condition that is not satisfied.

In practice, the third analysis step may comprise:

a transformation substep for transforming all or some of the n arguments $ANG_k$ constituting the first matrix $ANG_{1 \to n}$ so as to generate a fourth matrix $Pc_{1\to n}$ of transformed values $Pc_k$, the n arguments, $ANG_k$ corresponding to angles defined in the range it radians to $-\pi$ radians and the n transformed values $Pc_k$ corresponding to angles that are multiples of $2\pi$ radians;

a calculation substep for calculating a variance V from the n transformed values $Pc_k$ constituting the fourth matrix $Pc_{1\to n}$, the variance V having a dimension such that dim $(V)=2C$, where $Z_c$ is the number of teeth of the stationary ring co-operating with the moving part(s); and a third diagnosis substep for generating the third analysis result D3 that consists in a condition that is satisfied if a maximum value of the variance V is greater than a third predetermined threshold value S3 and conversely in a condition that is not satisfied if a maximum value of the variance V is less than or equal to the third predetermined threshold value S3.

As above, the third diagnosis substep consists in comparing the maximum value of the variance V with the third predetermined threshold value S3. Such a third predetermined threshold value 33 can thus likewise be determined by testing or by simulation and it may be stored in a storage unit. If necessary, it is thus possible to modify the severity of this third diagnosis substep by decreasing or by increasing the third threshold value S3. Specifically, the smaller the third threshold value S3, the greater the chance of the third analysis result D3 consisting in a condition that is satisfied, and conversely, the greater the third threshold value S3, the greater the chance of the third analysis result D3 consisting in a condition that is not satisfied.

In an advantageous implementation of the invention, the fourth analysis step may comprise:

a calculation substep for calculating a plurality of n Fourier transforms from the n reset values $C_k$ constituting the third matrix $C_{1\to n}$, the calculation substep serving to generate a fifth matrix $A_{1\to n}$ of amplitudes $A_k$ at the orders $0 \in [0, 10]$;

a calculation substep for calculating a sum of modulation energies $E_{bend}$ orders that are different from the order p, such that:

$$E_{band}=\Sigma_{k=1\to n}\Sigma_{0\neq p}A_k(o)$$

a calculation substep for calculating a sum of energies $E_p$, such that:

$$E_p=\Sigma_{k=1\to n}A_k(p); \text{ and}$$

a fourth diagnosis substep for generating the fourth analysis result D4 consisting in a condition that is satisfied if a ratio $$\frac{E_{band}}{E_p}$$

is greater than a fourth predetermined threshold value S4, and conversely in a condition that is not satisfied if the ratio $$\frac{E_{band}}{E_p}$$

is less than or equal to the fourth predetermined threshold value S4.

Thus, the fourth diagnosis substep consists in comparing the various values of the ratio $$\frac{E_{band}}{E_p}$$

with the fourth predetermined threshold value S4. Such a fourth predetermined threshold value S4 can likewise be determined by testing or by simulation, and it may be stored in a storage unit. If necessary, it, is thus possible to modify the severity of this fourth diagnosis substep by decreasing or increasing the fourth threshold value S4. Specifically, the smaller the fourth threshold value S4 the greater the chance of the fourth analysis result D4 consisting in a condition that, is satisfied, and conversely, the greater the fourth threshold value S4 the greater the chance of the fourth analysis result D4 consisting in a condition that is not satisfied.

BRIEF DESCRIPTION OF THE DRAWINGS

The invention and its advantages appear in greater detail in the context of the following description of examples given by way of illustration and with reference to the accompanying figures, in which:

FIG. 1 is a side view of an aircraft and of a ground station for performing the analysis method in accordance with the invention;

FIG. 2 is a block diagram showing a first variant of the analysis method in accordance with the invention;

FIG. 6 is a block diagram showing various substeps of a second analysis step of the analysis method in accordance with the invention;

FIG. 7 is a block diagram showing various substeps of a third analysis step of the analysis method in accordance with the invention; and FIG. 8 is a block diagram showing various substeps of a fourth analysis step of the analysis method in accordance with the invention.

DETAILED DESCRIPTION OF THE INVENTION

Figure 3:
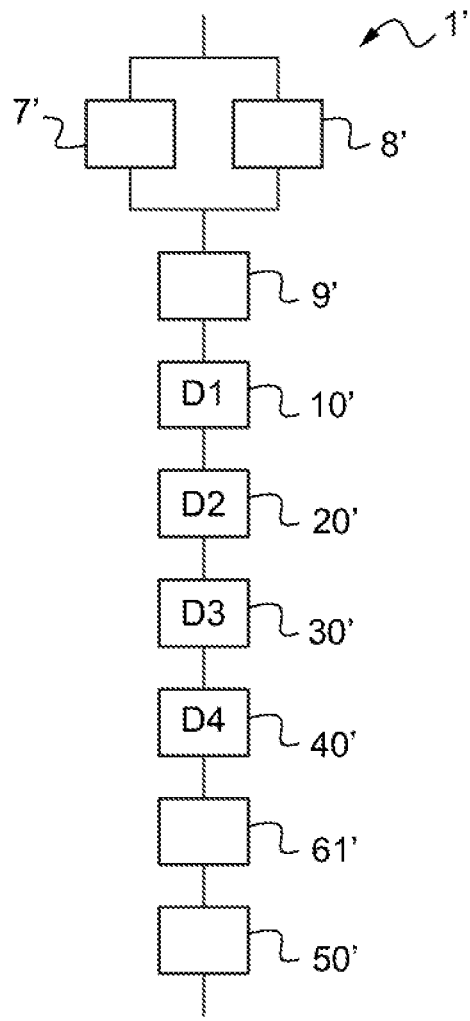
FIG. 3 is a block diagram showing a second variant of the analysis method in accordance with the invention.

Elements present in more than one of the figures are given the same references in each of them.

As mentioned above, the invention relates to a method of analyzing a vibratory signal derived from rotation of at least one moving part.

As shown in FIG. 1, the moving part(s) 2 is/are arranged in an aircraft 5, 5', where they form ail or part of a rotary mechanism 3 in a power transmission drive train 4. Such a drive train 4 is thus arranged between an engine 64 and at least one rotor 65 serving to provide the aircraft 5, 5' with lift and possibly also propulsion in the air.

The moving part(s) 2 present(s) at least one degree of freedom to move in rotation about an axis of rotation Z. By way of example, the moving part(s) 2 nay be formed by a sun gear, by a planet carrier, or by a planet gear of an epicyclic geartrain forming the rotary mechanism 3.

In addition, the aircraft 5, 5' includes at least one vibration sensor 6 serving to measure vibration in at least one direction and to generate a vibratory signal representing the operation of the rotary mechanism 3 as a function of time.

Such an aircraft 5/5' may also include an onboard memory 60, 60' serving to store all or part of the vibratory signal representing the operation of the rotary mechanism 3.

Optionally, the aircraft 5, 5' may also include a data transmission unit 63 for transmitting data representative of the vibratory signal representing the operation of the rotary mechanism 3 to at least one ground station 62. Such transmission of data representative of the vibratory signal may naturally take place on the ground after the aircraft 5, 5' has returned from a mission, or indeed while the aircraft 5, 5' is in a stage of flight while performing a mission.

As shown in FIGS. 2 and 3, the analysis method 1, 1' for analyzing the vibratory signal derived from the rotation of the moving part(s) 2 thus comprises a first measurement step 7, 7' for measuring the vibration in at least one direction and for generating the vibratory signal representing the operation of the rotary mechanism 3 as a function of time, and at least one second measurement step 8, 8' for measuring an angular position of the moving part(s) 2.

As shown in FIG. 2, in a first implementation, the first measurement step(s) 7 and the second measurement step(s) 8 may be performed sequentially.

As shown in FIG. 3, in a second implementation, the first measurement step(s) 7' and the second measurement step(s) 3' may be performed simultaneously or in parallel.

Furthermore, the analysis method 1, 1' includes a preprocessing step 9, 9' for calculating a plurality of arguments of complex numbers generated from complex vibrations of the vibratory signal as measured by the vibration sensor(s) 6 over a cycle of a predetermined number n of rotations of the moving part(s) 2 about the respective axis of rotation Z.

Thereafter, the analysis method 1, 1' has a first analysis step 10, 10' for determining an angle offset relating to a plurality of arguments, the first analysis step 10, 10' serving to generate a first analysis result D1. In addition, such a first analysis result D1 consists in a condition that is satisfied or not satisfied as a function of the angle offset.

Such an analysis method 1, 1' also has a second analysis step 20, 20' for determining low distortion of the plurality of arguments, this second analysis step 20, 20' serving to generate a second analysis result D2. Such a second analysis result D2 then consists in a condition that is satisfied or not satisfied as a function of the low distortion.

The analysis method 1, 1' then has a third analysis step 30, 30' for determining local instability in the plurality of arguments, the third analysis step 30, 30' serving to generate a third analysis result D3. This third analysis result D3 likewise consists in a condition that is satisfied or not satisfied as a function of the local instability.

Furthermore, the analysis method 1, 1' has a fourth analysis step 40, 40' for determining high distortion of the plurality of arguments, this fourth analysis step 40, 40' serving to generate a fourth analysis result D4. As above, the fourth analysis result D4 consists in a condition that is satisfied or not satisfied as a function of the high distortion.

Finally, the analysis method 1, 1' includes a validation step 50, 50' for determining at least one usable range of the vibratory signal, the validation step 50, 50' depending simultaneously on the first analysis result D1, on the second analysis result D2, on the third analysis result D3, and on the fourth analysis result D4.

Furthermore, and as shown in FIG. 3, the method 1' may also have a data transmission step 611 serving to transmit data representative of the vibratory signal to the ground station(s) 62. Such a transmission step 61' then serves to enable the validation step 50' to be performed away from the aircraft 5'. For this purpose, an onboard memory 60' serves to store continuously the vibratory signal on board the aircraft 5'.

Figure 4:
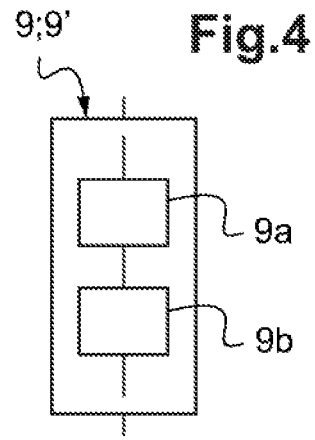
FIG. 4 is a block diagram showing various substeps of a preprocessing step of the analysis method in accordance with the invention.

As shown in FIG. 4, the preprocessing step 9, 9' may include a calculation substep 9a for calculating a first moving window Fourier transform on the basis of the vibratory signal. Furthermore, the preprocessing step 9, 9' may also include a calculation substep 9b for calculating a first matrix $ANG_{1 \to n}$ of n arguments $ANG_k$, where k varies over the range 1 to n, and where n corresponds to a number of rotations of the moving part(s) 2 about the respective axis of rotation Z.

Figure 5:
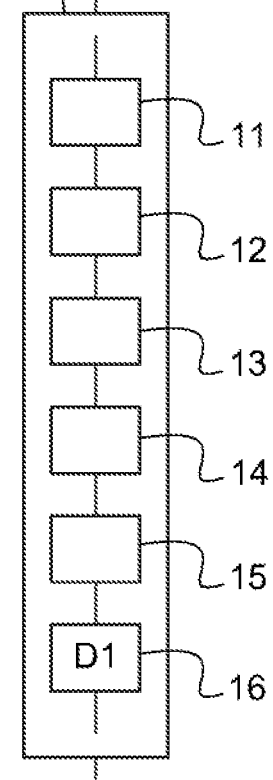
FIG. 5 is a block diagram showing various substeps of a first analysis step of the analysis method in accordance with the invention.

As shown in FIG. 5, the first analysis step 10, 10' may include a calculation substep 11 for calculating a second matrix of angle cosines $P_{1 \to n}$ from n cosine values $P_k$ of said first matrix $ANG_{1 \to n}$ and such that $P_k = \cos(ANG_k)$.

Such a first analysis step 10, 10' may also include a calculation substep 12 for calculating a mean value $P_{moy}$ from the n cosine values $P_k$ constituting the second matrix $P_{1 \to n}$ followed by an identification substep 13 for identifying a median signal $P_{med}$ by calculating the minimum Euclidean distance between the mean value $P_{moy}$ and each of the n cosine values $P_k$ constituting said second matrix $P_{1 \to n}$.

Furthermore, the first analysis step 10, 10' may include a calculation substep 14 for calculating n inter-correlation values $\hat{R}_k$, such that $\dim(\hat{R}_k) = 2Z_c - 1$, the n inter-correlation values $\hat{R}_k$ being obtained by performing a convolution product between the median signal $P_{med}$ and each of said n cosine values $P_k$ constituting the second matrix $P_{1 \to n}$, where $Z_c$ corresponds to the number of teeth of a stationary ring of the epicyclic geartrain co-operating with the moving part(s) 2.

Thereafter, the first analysis step 10, 10' may include a calculation substep 15 for calculating n time offset values $T_k$ such that $T_k$ corresponds to an abscissa value for an absolute maximum of a curve representing the n inter-correlation values $\hat{R}_k$, k varying over the range 1 to n, and when $k = P_{med}$, $T_{P_{med}} = \mathrm{argmax}(\hat{R}_{P_{med}}) = 0$.

Finally, the first analysis step 10, 10' may include a first diagnosis substep 16 for generating the first analysis result D1 consisting in a condition that is satisfied if at least one of the n values of the time offset where $T_k$, varies over the range 1 to n, is greater that a first predetermined threshold value S1, and conversely in a condition that is not satisfied if all of the n values of the time offset $T_k$ are less than or equal to the first predetermined threshold value S1.

As shown in FIG. 6, the second analysis step 20, 20' may include a resetting substep 21 for resetting the n cosine values $P_k$ constituting the second matrix $P_{1 \to n}$ by a number corresponding to the n values of a time offset $T_k$ so as to generate a third matrix $C_{1 \to n}$ of n reset values $C_k$ with k varying over the range 1 to n.

The second analysis step 20, 20' may then include a calculation substep 22 for calculating a second moving window Fourier transform from the median signal $P_{med}$ followed by a calculation substep 23 for calculating a mean argument value $\varphi_{moy}$ for a predetermined harmonic $H_m$ of the second Fourier transform, the mean argument value $\varphi_{moy}$ being such that:

$$\varphi_{moy} = a\tan 2(y, x) = \mathrm{Arg}(x + iy)$$

where x=Re(Hm) is a real part of the predetermined harmonic $H_m$ of the second Fourier transform, and where y=Im(Hm) is an imaginary part of the predetermined harmonic $H_m$ of the second Fourier transform.

The second analysis step 20, 20' may then also include a calculation substep 24 for calculating n values of a reference argument $P_{ref}$ such that $P_{ref}=A \cdot \cos(\omega t + \phi_{moy})$, with the coefficient A=1 and the angular frequency $$\omega = \frac{2 \cdot \pi \cdot p}{Z_C}.$$

Furthermore, such a second analysis step 20, 20' may include a comparison substep 25 comparing the n reset values $C_k$ constituting the third matrix $C_{1 \to n}$ with the n values of the reference argument $P_{ref}$, where such a comparison substep then generates n difference values $I_k$ such that $I_k = \Sigma |C_k - P_{ref}|$, with k varying over the range 1 to n.

Thereafter, the second analysis step 20, 20' then includes a calculation substep 26 for calculating normalized distortion EC defined by the formula:

$$EC = \frac{\sum_{k=1}^{n} I_k}{2 \cdot n \cdot Z_C}.$$

Finally, the second analysis step 20, 20' may include a second diagnosis step 27 for generating the second analysis result D2 consisting in a condition that is satisfied if the normalized distortion EC is greater than a second predetermined threshold value S2 and conversely a condition that is not satisfied if the normalized distortion EC is less than or equal to the second predetermined threshold value S2.

Furthermore, as shown in FIG. 7, the third analysis step 30, 30' may begin with a transformation substep 31 for transforming all or some of the n arguments ANG, constituting the first matrix $ANG_{1 \to n}$ so as to generate a fourth matrix $P_{1 \to n}$ of transformed values $Pc_k$, the n arguments $ANG_k$, corresponding to defined angles in the range $\pi$ radians to $-\pi$ radians and the n transformed values $Pc_k$ to angles that are multiples of $2\pi$ radians.

The third analysis step 30, 30' may then include a calculation substep 32 for calculating a variance V from the n transformed values $Pc_k$ constituting the fourth matrix $Pc_{1 \to n}$, with dim(V)=$Z_c$, and finally a third diagnosis substep 33 for generating a third analysis result D3 consisting in a condition that is satisfied if a maximum value of the variance V is greater than a third predetermined threshold value S3, and conversely a condition that is not satisfied if a maximum value of the variance V is less than or equal to the third predetermined threshold value S3.

Finally, and as shown in FIG. 8, the fourth analysis step 40, 40' may include a calculation substep 41 for calculating a plurality of n Fourier transforms from the n reset values $C_k$ constituting the third matrix $C_{1 \to n}$, this calculation substep 41 serving to generate a fifth matrix $A_{1 \to n}$ of amplitudes $A_k$ at the orders $o \in [0, 10]$.

Thereafter the fourth analysis step 40, 40' may include a calculation substep 42 for calculating a sum of the modulation energies $E_{band}$ at the orders that are different from the order p, such that:

$$E_{band} = \Sigma_{k=1 \to n} \Sigma_{o \neq p} A_k(o)$$

Such a fourth analysis step 40, 40' may include a calculation substep 43 of calculating an energy sum $E_p$ such that:

$$E_p = \Sigma_{k=1 \to n} A_k(p)$$

Finally, the fourth analysis step 40, 40' may include a fourth diagnosis substep 44 for generating the fourth analysis result D4 consisting in a condition that is satisfied if a ratio $$\frac{E_{band}}{E_p}$$

is greater than a fourth predetermined threshold value S4, and conversely a condition that is not satisfied if the ratio $$\frac{E_{band}}{E_p}$$

is less than or equal to the fourth predetermined threshold value S4.

Naturally, the present invention may be subjected to numerous variations as to its implementation. Although several implementations are described, it will readily be understood that it is not conceivable to identify exhaustively ail possible implementations. It is naturally possible to envisage replacing any of the means described by equivalent means without going beyond the ambit of the present invention.

What is claimed is:

1. A method of analyzing a vibratory signal derived from rotation of at least one moving part belonging to a rotary mechanism forming all or part of a drive train for transmitting drive torque, the rotary mechanism being fitted to an aircraft and the method comprising:
   at least one first measurement step including measuring vibration in at least one direction and generating a vibratory signal representative of the operation of the rotary mechanism as a function of time, the first measurement step being performed by means of at least one vibration sensor; and
   at least one second measurement step including measuring an angular position of the moving part(s), the moving part(s) having at least one degree of freedom to move in rotation about a respective axis of rotation Z, the second measurement step(s) serving to count a determined number n of rotations of the moving part(s) about the respective axis of rotation Z;
   wherein the method further comprises at least:
   a preprocessing step for calculating a plurality of arguments of complex numbers generated from complex vibrations of the vibratory signal measured by the vibration sensor(s) over a cycle of the predetermined number n of rotations of the moving part(s) about the respective axis of rotation Z;
   a first analysis step for determining an angle offset relating to the plurality of arguments, the first analysis step serving to generate a first analysis result D1, the first analysis result D1 being a condition that is satisfied or not satisfied as a function of the angle offset;
   a second analysis step for determining a first distortion, referred to as "low" distortion, of the plurality of arguments, the second analysis step serving to generate a second analysis result D2, the second analysis result D2 being a condition that is satisfied or not satisfied as a function of the first distortion;

a third analysis step for determining local instability of the plurality of arguments, the third analysis step serving to generate a third analysis result D3, the third analysis result D3 being a condition that is satisfied or not satisfied as a function of the local instability;

a fourth analysis step for determining a second distortion, referred to as a "high" distortion, of the plurality of arguments, the fourth analysis step serving to generate a fourth analysis result D4, the fourth analysis result D4 being a condition that is satisfied or not satisfied as a function of the second distortion, the second distortion being distinct from the first distortion;

a validation step for determining at least one usable time range for the vibratory signal, the validation step depending simultaneously on the first analysis result D1, on the second analysis result D2, on the third analysis result D3, and on the fourth analysis result D4;

the validation step being successful in determining the at least one usable time range for the vibratory signal as each of the first analysis result D1, the second analysis result D2, the third analysis result D3, and the fourth analysis result D4 simultaneously is a respective condition that is not satisfied during part of the time that the vibratory signal is generated;

a storing step for storing the vibratory signal only in the at least one usable time range in an onboard memory of the aircraft;

a monitoring step for monitoring wear of the at least one moving part based on the vibratory signal over the at least one usable time range stored in the onboard memory; and wherein the preprocessing step, the first analysis step, the second analysis step, the third analysis step, the fourth analysis step, the validation step, and the storing step are performed on board the aircraft while the aircraft is in flight whereby the at least one usable time range for the vibratory signal is determined directly while the aircraft is in flight with a quantity of data that is stored on the onboard memory pertaining to the vibratory signal being limited to only the vibratory signal in the at least one usable time range.

2. The method according to claim 1, wherein the validation step is further performed on the ground, the aircraft including an onboard memory for continuously storing the vibratory signal.

3. The method according to claim 1, wherein the method includes a data transmission step enabling data representative of the vibratory signal to be transmitted to at least one ground station.

4. The method according to claim 3, wherein the data transmission step takes place while being simultaneously dependent on the first analysis result D1, on the second analysis result D2, on the third analysis result D3, and on the fourth analysis result D4.

5. The method according to claim 1, wherein the preprocessing step comprises:

a calculation substep for calculating a first moving window Fourier transform from the vibratory signal; and a second calculation substep for calculating a first matrix $ANG_{1 \to n}$ of n arguments $ANG_k$, where k varies over the range 1 to n, where n corresponds to a number of rotations of the moving part(s) about the respective axis of rotation Z.

6. The method according to claim 5, wherein the first analysis step comprises:

a calculation substep for calculating a second matrix of angle cosines $P_{1 \to n}$ from n cosine values $P_k$ of the first matrix $ANG_{1 \to n}$, and such that:

$$P_k = \cos(ANG_k)$$

a calculation substep for calculating a mean value $P_{moy}$ from the n cosine values $P_k$ constituting the second matrix $P_{1 \to n}$;

an identification substep for identifying a median signal $P_{med}$ by calculating the minimum Euclidean distance between the mean value $P_{moy}$ and each of the n cosine values $P_k$ constituting the second matrix $P_{1 \to n}$;

a calculation substep for calculating n inter-correlation values $\hat{R}_k$, such that $\dim(\hat{R}_k) = 2Z_c - 1$, the n inter-correlation values $\hat{R}_k$ being calculated by taking the convolution product between the median signal $P_{med}$ and each of the n cosine values $P_k$ constituting the second matrix $P_{1 \to n}$, where $Z_c$ corresponds to a number of teeth of a stationary ring co-operating with the moving part(s);

a calculation substep for calculating n time offset values $T_k$, such that $T_k$ corresponds to an abscissa value for an absolute maximum of a curve representative of the n cross-correlation values $\hat{R}_k$, k varying over the range 1 to n, and when $k = P_{med}, T_{P_{med}} = \text{argmax}(\hat{R}_{P_{med}}) = 0$; and a first diagnosis substep for generating the first analysis result D1 that is a condition that is satisfied if at least one of the n values of the time offset $T_k$, where k varies over the range 1 to n, is greater than a first predetermined threshold value S1, and conversely in a condition that is not satisfied if all of the n values of the time offset $T_k$ are less than or equal to the first predetermined threshold value S1.

7. The method according to claim 6, wherein the second analysis step comprises:

a resetting substep of resetting the n cosine values $P_k$ constituting the second matrix $P_{1 \to n}$ by a number corresponding to the n values of a time offset $T_k$ in order to generate a third matrix $C_{1 \to n}$ of n reset values $C_k$ for k varying over the range 1 to n;

a calculation substep for calculating a second moving window Fourier transform from the median signal $P_{med}$;

a calculation substep for calculating a mean argument value $\varphi_{moy}$ for a predetermined harmonic $H_m$ of the second Fourier transform, the mean argument value $\varphi_{moy}$ being such that:

$$\varphi_{moy} = \text{atan2}(y, x) = \text{Arg}(x + iy)$$

where $x = \text{Re}(Hm)$ is the real part of the predetermined harmonic $H_m$ of the second Fourier transform and $y = \text{Im}(Hm)$ is the imaginary part of the predetermined harmonic $H_m$ of the second Fourier transform;

a calculation substep for calculating n values of a reference argument $P_{ref}$ such that $P_{ref} = A \cdot \cos(\omega t + \varphi_{moy})$, with the coefficient $A = 1$ and with the angular frequency $$\omega = \frac{2 \cdot \pi \cdot p}{Z_C};$$

a comparison substep for comparing the n reset values $C_k$ constituting the third matrix $C_{1 \to n}$ and the n values of the reference argument $P_{ref}$, the comparison substep generating n difference values $I_k$, such that:

$$I_k = \Sigma |C_k - P_{ref}|$$

with k varying over the range 1 to n;

a calculation substep for calculating a normalized distortion EC such that:

$$EC = \frac{\sum_{k=1}^{n} I_k}{2 \cdot n \cdot Z_C};$$

and a second diagnosis substep for generating the second analysis result D2 being a condition that is satisfied if the normalized distortion EC is greater than a second predetermined threshold value S2, and conversely a condition that is not satisfied if the normalized distortion EC is less than or equal to the second predetermined threshold value S2.

8. The method according to claim 7, wherein the fourth analysis step comprises:

a calculation substep for calculating a plurality of n Fourier transforms from the n reset values $C_k$ constituting the third matrix $C_{1 \to n}$, the calculation substep serving to generate a fifth matrix $A_{1 \to n}$ of amplitudes $A_k$ at the orders $o \in [0, 10]$;

a calculation substep for calculating a sum of modulation energies $E_{band}$ at orders that are different from the order p, such that:

$$E_{band} = \Sigma_{k=1 \to n} \Sigma_{o \neq p} A_k(o)$$

a calculation substep for calculating a sum of energies $E_p$, such that:

$$E_p = \Sigma_{k=1 \to n} A_k(p);$$

and a fourth diagnosis substep for generating the fourth analysis result D4 being a condition that is satisfied if a ratio $$\frac{E_{band}}{E_p}$$

is greater than a fourth predetermined threshold value S4, and conversely in a condition that is not satisfied if the ratio $$\frac{E_{band}}{E_p}$$

is less than or equal to the fourth predetermined threshold value S4.

9. The method according to claim 5, wherein the third analysis step comprises:

a transformation substep for transforming all or some of the n arguments $ANG_k$ constituting the first matrix $ANG_{1 \to n}$, so as to generate a fourth matrix $Pc_{1 \to n}$ of transformed values $Pc_k$, the n arguments, $ANG_k$ corresponding to angles defined in the range $\Pi$ radians to $-\Pi$ radians and the n transformed values $Pc_k$ corresponding to angles that are multiples of $2\Pi$ radians;

a calculation substep for calculating a variance V from the n transformed values $Pc_k$ constituting the fourth matrix $Pc_{1 \to n}$, the variance V having a dimension such that $dim(V) = Z_c$, where $Z_c$ is the number of teeth of the stationary ring co-operating with the moving part(s); and a third diagnosis substep for generating the third analysis result D3 that is a condition that is satisfied if a maximum value of the variance V is greater than a third predetermined threshold value S3 and conversely in a condition that is not satisfied if a maximum value of the variance V is less than or equal to the third predetermined threshold value S3.

10. The method according to claim 1, wherein the second distortion corresponds to a distortion of higher order and/or of greater intensity than the first distortion.

11. A method of analyzing a vibratory signal derived from rotation of a moving part belonging to a rotary forming all or part of a drive train for transmitting drive torque, the rotary being fitted to an aircraft and the method comprising:

a first measurement step including measuring vibration in a direction and generating a vibratory signal representative of the operation of the rotary as a function of time, the first measurement step being performed by a vibration sensor;

a second measurement step including measuring an angular position of the moving part, the moving part having at least one degree of freedom to move in rotation about a respective axis of rotation, the second measurement step serving to count a determined number of rotations of the moving part about the respective axis of rotation;

a preprocessing step for calculating a plurality of arguments of complex numbers generated from complex vibrations of the vibratory signal measured by the vibration sensor over a cycle of the predetermined number of rotations of the moving part about the respective axis of rotation;

a first analysis step for determining an angle offset relating to the plurality of arguments, the first analysis step serving to generate a first analysis result D1 that is satisfied or not satisfied as a function of the angle offset;

a second analysis step for determining a first distortion, referred to as "low" distortion, of the plurality of arguments, the second analysis step serving to generate a second analysis result D2 that is satisfied or not satisfied as a function of the first distortion;

a third analysis step for determining local instability of the plurality of arguments, the third analysis step serving to generate a third analysis result D3 that is satisfied or not satisfied as a function of the local instability;

a fourth analysis step for determining a second distortion, referred to as a "high" distortion, of the plurality of arguments, the fourth analysis step serving to generate a fourth analysis result D4 that is satisfied or not satisfied as a function of the second distortion, the second distortion being distinct from the first distortion; and a validation step for determining at least one usable time range for the vibratory signal, the validation step depending simultaneously on the first analysis result D1, on the second analysis result D2, on the third analysis result D3, and on the fourth analysis result D4;

the validation step being successful in determining the at least one usable time range for the vibratory signal as each of the first analysis result D1, the second analysis result D2, the third analysis result D3, and the fourth analysis result D4 simultaneously is a respective condition that is not satisfied during part of the time that the vibratory signal is generated;

a storing step for storing the vibratory signal only in the at least one usable time range in an onboard memory of the aircraft;

a monitoring step for monitoring wear of the moving part based on the vibratory signal over the at least one usable time range stored in the onboard memory; and wherein the preprocessing step, the first analysis step, the second analysis step, the third analysis step, the fourth analysis step, the validation step, and the storing step are performed on board the aircraft while the aircraft is in flight whereby the at least one usable time range for the vibratory signal is determined directly while the aircraft is in flight with a quantity of data that is stored on the onboard memory pertaining to the vibratory signal being limited to only the vibratory signal in the at least one usable time range.

12. The method according to claim 11, wherein the validation step is further performed on the ground, the aircraft including an onboard memory for continuously storing the vibratory signal.

13. The method according to claim 11, wherein the method includes a data transmission step enabling data representative of the vibratory signal to be transmitted to at least one ground station.

14. The method according to claim 11, wherein the second distortion corresponds to a distortion of higher order and/or of greater intensity than the first distortion.

* * * * *